(No Model.)

G. LAND.
FILTER.

No. 244,262. Patented July 12, 1881.

WITNESSES:
Francis McArdle.
C. Sedgwick

INVENTOR:
G. Land
BY Munn & Co.
ATTORNEYS.

N. PETERS, Photo-Lithographer, Washington, D. C.

UNITED STATES PATENT OFFICE.

GORDON LAND, OF ALAMOSA, COLORADO.

FILTER.

SPECIFICATION forming part of Letters Patent No. 244,262, dated July 12, 1881.

Application filed May 11, 1881. (No model.)

*To all whom it may concern:*

Be it known that I, GORDON LAND, of Alamosa, in the county of Conejos and State of Colorado, have invented a new Improvement in Filters, of which the following is a full, clear, and exact description.

My invention consists of an improved upward water-filter constructed with suitable gate or gates upon one side of the filter-box and a reservoir or penstock upon the other, whereby the water is forced up through the filtering material and the filter cleaned of sediment, when desired, by the action of the water.

The invention further consists of a supply-sluice in combination with the reservoir or penstock and filter-box, the supply-sluice being provided with a gate at the bottom and an overflow-gate for relieving the water of the sedimentary deposits and floating matter; and also in the construction and combination of parts, as hereinafter fully described and claimed.

Figure 1:
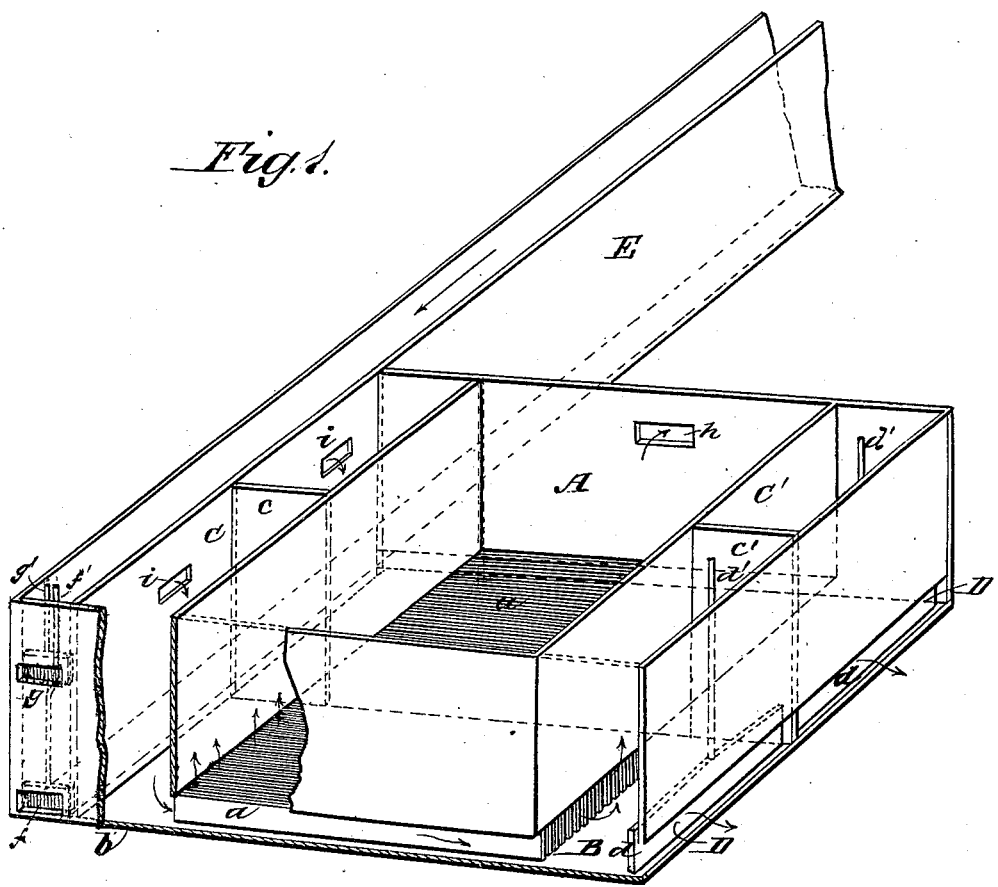
Figure 2:
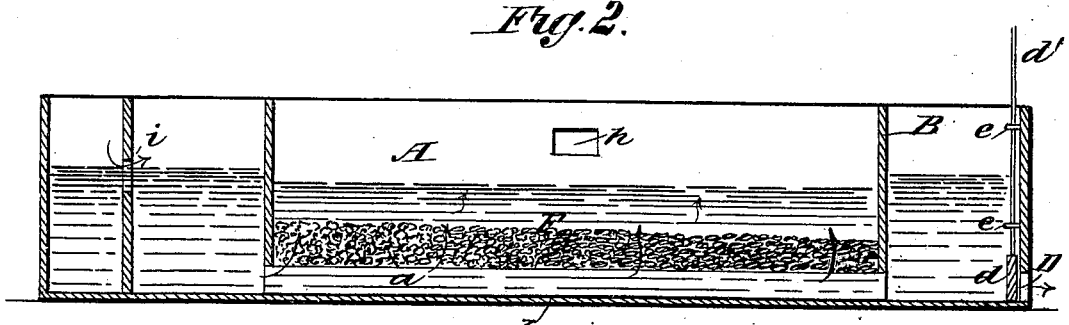

In the accompanying drawings, Figure 1 is a perspective view of my invention, and Fig. 2 is a cross-section thereof.

Similar letters of reference indicate corresponding parts.

The filter-box A rests upon the slats or scantling $a$, which are of suitable size and strength to support the filtering material F, and are placed upon their edges, a small distance apart, upon the floor $b$ of the outside box, B, as shown. The filter-box is of such size relative to the outside box, B, as to form the reservoir or penstocks C C' at the sides of the filter-box, both of which have the partitions $c\,c'$ placed in them for the purpose hereinafter stated. The reservoir C' has the outside openings, D D, at the bottom thereof, which are closed by the sliding gates $d\,d$, which gates are operated by the rods or bars $d'\,d'$, which move in the staples or other suitable guides, $e\,e$, secured on the inside of the box. The penstock C is provided near the top with the openings $i\,i$, through which the water from the race E passes for supplying the filter. The race E is formed with the gate $f$ at the bottom and the gate $g$ near the top, as shown, which gates are operated respectively by the rods or bars $f'$ and $g'$ to open and close the openings. The filter-box is provided with the discharge-opening $h$ near its upper side, as shown, through which the filtered water passes.

The water to be filtered passes from the race E into the reservoir or penstock C, and from thence to the reservoir or penstock C'. In both of these reservoirs or penstocks a water-head is maintained which for the sluiceways formed by the strips or scantling up through the filtering material.

When it is desired to clean the filtering material and the bottom of the filter of the sediment which will collect in them the gates $d\,d$ are to be opened, and the current caused by the flow of water through the gates will carry away and thoroughly remove the sediment, the partitions $c\,c'$ serving to cause an equal flow upon both sides to expel the sediment from all parts of the filter. The sediment which collects in the bottom of the race E will be carried away upon opening the gate $f$, and the floating matter may be removed and carried off by opening the gate $g$.

Having thus described my invention, what I claim as new, and desire to secure by Letters Patent, is—

1. The filter-box A, resting upon the slats $a$, in combination with the reservoir or penstocks C C', substantially as and for the purposes set forth.

2. The filter-box A, resting upon the slats $a$, in combination with the reservoir or penstock C', provided with the openings D and the gates $d$, substantially as and for the purpose set forth.

3. The filter-box A, resting upon the slats $a$, and the penstocks C C', in combination with the sluice E, provided with the gates $f$ and $g$, substantially as and for the purposes specified.

4. The filter herein described, composed of the filter-box A, resting upon the slats $a$, which form sluices for the upward current of water through the filtering material, the reservoirs or penstocks C C', the reservoir or penstock C' being provided with the openings D D and the gates $d\,d$, and the race E, provided with the gates $f$ and $g$, the penstocks being provided with the partitions $c\,c'$, substantially as and for the purposes specified.

GORDON LAND.

Witnesses:
THEO. W. HERR,
FRED. J. LAND.